(12) United States Patent
Green et al.

(10) Patent No.: US 10,684,255 B2
(45) Date of Patent: Jun. 16, 2020

(54) METHOD OF FT-IMS USING FREQUENCY MODULATION

(71) Applicant: Micromass UK Limited, Wilmslow (GB)

(72) Inventors: Martin Raymond Green, Bowdon (GB); Keith George Richardson, High Peak (GB)

(73) Assignee: Micromass UK Limited, Wilmslow (GB)

( * ) Notice: Subject to any disclaimer, the term of this patent is extended or adjusted under 35 U.S.C. 154(b) by 1031 days.

(21) Appl. No.: 15/078,598

(22) Filed: Mar. 23, 2016

(65) Prior Publication Data

US 2016/0282305 A1 Sep. 29, 2016

(30) Foreign Application Priority Data

Mar. 24, 2015 (GB) .................................. 1504934.9

(51) Int. Cl.
*G01N 27/62* (2006.01)
*H01J 49/00* (2006.01)

(52) U.S. Cl.
CPC .......... *G01N 27/622* (2013.01); *H01J 49/004* (2013.01); *H01J 49/0027* (2013.01)

(58) Field of Classification Search
CPC ... G01N 27/622; H01J 49/004; H01J 49/0027
See application file for complete search history.

(56) References Cited

U.S. PATENT DOCUMENTS

| | | | |
|---|---|---|---|
| 4,633,083 A | 12/1986 | Knorr et al. | |
| 4,707,602 A | 11/1987 | Knorr | |
| 4,855,593 A | 8/1989 | Bodenhausen et al. | |
| 6,580,068 B1 | 6/2003 | Tarver, III et al. | |
| 6,992,283 B2 | 1/2006 | Bateman et al. | |
| 7,031,877 B2 | 4/2006 | LeGore et al. | |
| 7,069,152 B2 | 6/2006 | Skilling | |
| 7,250,306 B2 | 7/2007 | Guevremont et al. | |
| 7,388,197 B2 | 6/2008 | McLean et al. | |
| 8,022,359 B2 | 9/2011 | Michelmann | |
| 8,431,886 B2 | 4/2013 | Grother, Jr. | |
| 9,646,814 B2 | 5/2017 | Brown et al. | |
| 9,829,465 B2* | 11/2017 | Green | H01J 49/0036 |
| 2003/0226964 A1 | 12/2003 | Tarver, III et al. | |
| 2009/0294647 A1 | 12/2009 | Michelmann | |
| 2013/0292562 A1* | 11/2013 | Clemmer | G01N 27/622 250/282 |

(Continued)

FOREIGN PATENT DOCUMENTS

GB 2537739 A 10/2016
GB 2537740 A 10/2016

OTHER PUBLICATIONS

Knorr, F.J. et al., "Fourier Transform Ion Mobility Spectrometry", Analytical Chemistry, vol. 57, No. 2, pp. 402-406. (1985).

(Continued)

*Primary Examiner* — Brooke Purinton

(57) ABSTRACT

A method of Fourier Transform ion mobility mass spectrometry is disclosed comprising determining the presence of different types of ions by determining that the different types of ions have different combinations of ion mobility and mass to charge ratio.

20 Claims, 2 Drawing Sheets

(56) References Cited

U.S. PATENT DOCUMENTS

| | | | |
|---|---|---|---|
| 2015/0041636 A1* | 2/2015 | Giles | H01J 49/004 250/282 |
| 2016/0003773 A1 | 1/2016 | Giles et al. | |
| 2016/0282305 A1 | 9/2016 | Green et al. | |
| 2016/0284530 A1 | 9/2016 | Green et al. | |
| 2016/0320341 A1 | 11/2016 | Knochenmuss | |
| 2018/0100830 A1 | 4/2018 | Gonin et al. | |

OTHER PUBLICATIONS

Belov, Mikhail E. et al., "Multiplexed Ion Mobility Spectrometry-Orthogonal Time-of-Flight Mass Spectrometry", Analytical Chemistry, vol. 79, No. 6, pp. 2451-2462. (2007).

Clowers, B. H. et al., "Hadamard Transform Ion Mobility Spectrometry", Analytical Chemistry, American Chemical Society, vol. 78, No. 1, pp. 44-51. (2006).

Szumlas, Andrew W. et al., "Hadamard Transform Ion Mobility Spectrometry", Analytical Chemistry, vol. 78, No. 13, pp. 4474-4481. (2006).

Qi et al., "Phase Correction of Fourier Transform Ion Cyclotron Resonance Mass Spectra Using MatLab", J. Am. Soc. Mass Spectrom., vol. 22, No. 1, p. 138-147, Jan. 2011.

Search Report for United Kingdom Application No. GB1616405.5 dated Mar. 10, 2017, 4 pages.

International Search Report and Written Opinion for International Application No. PCT/GB2017/052775 dated Dec. 11, 2017, 18 pages.

Clowers, B., et al., "A Two-Phase Approach to Fourier Transform Ion Mobility Time-of-Flight Mass Spectrometry", Analyst, 140(20):6862-6870, Jan. 1, 2015.

Examination Report for GB Application No. GB1604627.8 dated Oct. 19, 2017.

Dietiker, R., et al., "Fourier Transform Ion Mobility Measurement of Chain Branching in Mass-Selected, Chemically Trapped Oligomers from Methylalumoxane-Activated, Metallocene-Catalyzed Polymerization of Ethylene", Journal of the American Chemical Society 129(10):2796-802, Apr. 2007.

Knorr, "Fourier Transform Time-of-Flight Mass Spectrometry", Analytical Chemistry, vol. 57, pp. 690-694, 1986.

Knorr et al., "Fourier Transform Ion Mobility Spectrometry", Analytical Chemistry, vol. 57, No. 2, pp. 402-406, 1985.

Szumlas et al., "Phase-Resolved Detection in Ion-Mobility Spectrometry", Analytica Chimica, vol. 566, pp. 45-54, 2006.

Blom, K. F., Utility of Peak Shape Analyses in Determining Unresolved Interferences in Exact Mass Measurements at Low Resolution, Journal of the American Society for Mass Spectrometry, vol. 9, p. 89-98, 1998.

* cited by examiner

Ion gate voltage frequency m/z m/z m/z

METHOD OF FT-IMS USING FREQUENCY MODULATION

CROSS-REFERENCE TO RELATED APPLICATION

This application claims priority from and the benefit of United Kingdom patent application No. 1504934.9 filed on 24 Mar. 2015. The entire contents of this application are incorporated herein by reference.

FIELD OF THE INVENTION

The present invention generally relates to mass and/or ion mobility spectrometry and a spectrometer for performing such techniques. Embodiments of the invention relate to Fourier transform spectrometry and spectrometers.

BACKGROUND

Fourier transform time of flight and ion mobility spectrometers (and other velocity dispersive analysis) are well known. For example, see Knorr et al Anal. Chem. 1986. 58. 690-694 and Knorr, Hill Anal. Chem. 1985, 57, 402-406.

Fourier Transform Ion Mobility Spectrometry (FT-IMS) is a multiplexing technique in which ions are gated into and out of the ion mobility separator (IMS) cell by ion gates arranged at the ends of the IMS device. The gating signal that opens and closes the ion gate is generally identical on both ion gates and the frequency of the gating signal on each ion gate is swept with time. The duty cycle of the gating of the ion beam on both gates is generally set to 50%.

According to this arrangement, the amplitude of the output signal from the IMS device, for an ion of specific mobility, varies as a substantially triangular wave function that has a frequency that is characteristic of the ion's ion mobility. The ion signal may be measured as a function of the ion gate signal frequency. A Fourier transform is then applied to this data obtained in the ion gate frequency domain so as to produce an ion mobility separation spectrum.

An advantage of FT-IMS is a much improved duty cycle compared to conventional atmospheric pressure ion mobility separation. In conventional atmospheric pressure ion mobility separation, ions are introduced into the drift region by rapidly opening and closing an ion gate once per IMS separation cycle. Typical gating times are in the order of 100 micro-seconds, whereas typical drift times through the IMS device are in the order of 100 milli-seconds, thus leading to a duty cycle in the order of 0.1%.

FT-IMS also has advantages over sub-atmospheric RF confined IMS techniques. In sub-atmospheric RF confined IMS devices ions are intermittently pulsed into the IMS device. In order to improve the duty cycle, between pulses when ions are not being admitted into the IMS device, the ions may be accumulated in an ion trapping region upstream of the IMS device. However, if the ion flux towards the IMS device is high then the charge density in the ion trapping region, or in the IMS device, may become high and the resulting space-charge effects may cause a loss of signal or distortions in the drift times of ions through the IMS device. These problems may be avoided in FT-IMS techniques because gating frequency allows the device to receive a continuous ion beam and operate with a relatively high duty cycle, without the need to store ions in an upstream ion trap.

Fourier transform techniques are also known to be used in orbital trapping electrostatic ion traps and FT-ICR mass spectrometers. According to these techniques, ions oscillate in a trapping field in a manner that is dependent on the mass to charge ratios of the ions. These oscillations are detected and the resulting signal is measured in the time domain. This signal is then converted to the frequency domain by using a Fourier transform to produce a mass spectrum. In these instruments, Fourier transformation of time domain data results in a complex frequency spectrum (i.e. comprising real and imaginary parts). For example, see Ref. J Am Soc Mass Spectrom. 2011 January; 22(1):138-47 Phase Correction of Fourier Transform Ion Cyclotron Resonance Mass Spectra Using MatLab.

When all signals have zero phase, the transformation from the measurement time-domain to the frequency-domain can be written as follows:

$$F(\omega) = \int F(t) e^{i\omega t} dt = A(\omega) + i D(\omega)$$

where $\omega$ is the characteristic frequency of the amplitude of the measured signal; $F(\omega)$ is the frequency domain data; $A(\omega)$ is the real part of the spectrum (absorption mode spectrum); and $D(\omega)$ is the imaginary part of the spectrum (dispersion mode spectrum).

It is also known to couple an FT-IMS instrument to a triple quadruple system in order to produce mass selected FT signals, which greatly simplifies analysis. In this technique an IMS spectrum is produced for all ions within the range of mass to charge ratios selected.

It is desired to provide an improved method of ion mobility and/or mass spectrometry and an ion mobility and/or mass spectrometer.

SUMMARY

From a first aspect the present invention provides a method of ion mobility mass spectrometry comprising:

transmitting a plurality of ions to an ion mobility separator;

modulating the introduction of the ions into the ion mobility separator at a first modulation frequency;

separating the ions that enter the ion mobility separator according to ion mobility;

detecting ions that have exited the ion mobility separator with a detector;

wherein the transmission of ions from the ion mobility separator to the detector is modulated at a second modulation frequency, or the detector output is modulated at a second modulation frequency;

varying the first and second modulation frequencies with time;

determining the mass to charge ratios of the ions;

recording the intensity of the ion signal output from the detector as a function of the first or second modulation frequency and as a function of mass to charge ratio of the ions;

determining, from the variation in intensity of the ion signal as a function of the first or second modulation frequency, the ion mobilities of the ions that have been detected, wherein the ion mobility for any given ion that has been detected is associated with the mass to charge ratio determined for that ion; and determining the presence of different types of ions in said plurality of ions by determining that the different types of ions have different combinations of ion mobility and mass to charge ratio.

The detector output may be modulated at the second modulation frequency by electronics and/or software in the detector. For example, the detector may be a detector system including a data acquisition system and the data acquisition system may modulate the data that is recorded so as to produce the detector output that is modulated at the second modulation frequency. In other words, only some of the data may be recorded by the acquisition system.

By recording the intensity of the ion signal output from the detector as a function of the first or second modulation frequency and as a function of mass to charge ratio of the ions, the signal intensity, ion mobility and mass to charge ratio are associated with each other for each type of ions. This enables different ions that overlap in either mass to charge ratio or ion mobility to be resolved. The resolved data can then be used to more accurately obtain the mass to charge ratios or ion mobilities of the different ions.

As discussed in the Background section, Knorr et al (Anal. Chem 1985) and Knorr et al (Anal. Chem 1986) disclose FT-IMS devices. However, there is no disclosure or suggestion in these techniques to determine the presence of different types of ions by determining that the different types of ions have different combinations of ion mobility and mass.

Hieftje et al, Anal. Chem. Vol. 566, 28 Feb. 2006 "Phase-resolved detection in ion-mobility spectrometry", pages 45-54 discloses a FT-IMS method in which the ion gates are modulated at frequencies that maximise the phase difference in the ion signal, and hence better resolve ions having only slightly different ion mobilities. However, this document also does not disclose determining the masses of the ions and hence does not disclose determining the presence of different types of ions by determining that the different types of ions have different combinations of ion mobility and mass. Rather, Hieftje et al uses an alternative technique of modulating the gate frequencies in a particular manner and PCA analysis in order to better resolve different ions.

According to the embodiments of the present invention, the ion signal output from the detector may be comprised of contributions of different ion signals from different types of ions, wherein the ion signal from each of the different types of ions varies in intensity as a function of the first or second modulation frequency with a frequency that is characteristic of the ion mobility for that ion, and wherein said characteristic frequency associated with each different type of ion is used to determine the ion mobility of that ion.

Optionally, the ion signal from each of the different types of ions varies in intensity as a function of the first or second modulation frequency as a substantially triangular wave function.

The intensity of the ion signal output from the detector may be measured as a function of the first or second modulation frequency so as to obtain data in a modulation frequency domain; and the method may comprise processing said data so as to transform it from said modulation frequency domain into the time domain so as to represent the intensity of the ion signal output from the detector as a function of the drift time through the ion mobility separator; and the ion mobilities of the ions may be determined from the drift times at which the ion signal peaks.

The method may comprise transforming the data from said modulation frequency domain into the time domain so as to represent the intensity of the ion signal output from the detector as a function of the drift time through the ion mobility separator and as a function of mass to charge ratio.

The ion signal output from the detector may be comprised of contributions of different ion signals from different types of ions, and the ion signals contributed by the different types of ions may not overlap with each other when represented in a two dimensional space as function mass to charge ratio and drift time.

The data may be transformed from said modulation frequency domain into the time domain by Fourier transformation; or the data may be transformed from said modulation frequency domain into the time domain by a forward modelling deconvolution technique.

The method may comprise processing the data using a forward modelling deconvolution technique so as to transform the data from said modulation frequency domain into data in the time domain so as to represent the intensity of the ion signal output from the detector as a function of the drift time of the ions through the ion mobility separator. The method may then identify one or more peaks in the ion signal within the time domain data; determine a drift time at which each of said one or more peaks occurs; and use the drift time associated with each peak to determine the ion mobility of an ion.

As described above, in the modulation frequency domain the ion signal output from the detector may vary in intensity as a function of the first or second modulation frequency with a frequency that is characteristic of the ion's drift time through the ion mobility separator. Alternatively, a plurality of different types of ions may be transmitted to the ion mobility separator, and the ion signal output from the detector may be comprised of contributions of different ion signals from the different types of ions, wherein in the modulation frequency domain the ion signal from each of the different types of ions varies in intensity as a function of the first or second modulation frequency with a frequency that is characteristic of the ion's drift time through the ion mobility separator.

The ion signal from each one of different types of ions may vary in intensity as a function of the first or second modulation frequency as a substantially triangular wave function.

Optionally, the forward modelling deconvolution technique comprises defining a plurality of model signals having different combinations of frequency and amplitude, superimposing the model signals and comparing the resulting composite signal to the signal output from the detector, and determining if the composite signal matches the ion signal output from the detector.

Optionally, if the composite signal does not match the ion signal output from the detector, then the amplitude and/or frequency of one or more of the model signals is altered, the model signals are superimposed again and the resulting composite signal is compared to the signal output from the detector to determine if the composite signal matches the ion signal output from the detector.

The method may perform the steps of: (i) modifying the amplitude and/or frequency of the model signals, (ii) superimposing the model signals, (iii) comparing the resulting composite signal to the signal output from the detector, and (iv) determining if the composite signal matches the ion signal output from the detector; wherein steps (i)-(iv) are repeatedly performed in an iterative manner until the superimposed model signals match the ion signal output from the detector (optionally to within a predetermined tolerance), or until no significant further improvement can be attained.

A maximum likelihood method, a maximum entropy method, a maximum a posteriori (MAP) method or a Bayesian method may be used in said iterative manner to determine when the superimposed model signals match the ion signal output from the detector.

In a specific example, a nested sampling technique (e.g. Skilling 2006) may be used to obtain a representative set of deconvolved signals.

Each model signal (of the superimposed model signals that match the ion signal output from the detector) optionally represents a different type of ion; wherein the frequency and amplitude of each model signal are used to determine the ion mobility and intensity, respectively, of the ion that the model signal represents.

The model signals are optionally periodic signals.

The method optionally comprises: obtaining a relationship between the mass to charge ratios of the ions and the drift times of the ions; mass analysing the ions to determine the mass to charge ratios of the ions; using the determined mass to charge ratios and said relationship to estimate the ion mobilities of the ions; selecting only model signals having frequencies that are representative of the estimated ion mobilities; and using only these selected model signals in said forward modelling technique. Alternatively, information regarding the likely distribution of ion mobilities may be used to define a prior probability distribution over ion mobility or the two dimensional space of mass to charge and ion mobility in a probabilistic analysis of the data.

Said step of mass analysing may comprise mass analysing the ions downstream of the ion mobility separator. Alternatively, said step of mass analysing may comprise mass analysing said ions upstream of the ion mobility separator, optionally wherein said mass analysing is performed by providing a mass filter upstream of the ion mobility separator and mass selectively transmitting ions of known mass to charge ratio to the ion mobility separator. The mass to charge ratio or range of ratios transmitted by the mass filter may be scanned or stepped with time.

The step of obtaining a relationship between the mass to charge ratios of the ions and the drift times of the ions may comprise experimentally determining said relationship by mass analysing and ion mobility analysing the ions, or looking up a predetermined relationship.

The method may comprise determining a range of drift times or ion mobilities that are associated with one of the different types of ion, filtering the data so as to include only ion signal intensity data and mass to charge ratio data that are associated with drift times or ion mobilities in said range, and identifying the mass to charge ratio of said one of the different types of ion from the filtered data.

Data for ions other than said one of the different types of ion may be filtered out.

Said range of drift times or ion mobilities may be determined to correspond to the drift times that correspond to a peak in the intensity signal in the time domain.

Said one of the different types of ion may be associated with mass to charge ratios that overlap with the mass to charge ratios of another of said different types of ions, but the range of drift times or ion mobilities that are associated with said one of the different types of ion may not overlap with the range of drift times or ion mobilities that are associated with said another of the different types of ions.

The method may comprise determining a range of mass to charge ratios that are associated with one of the different types of ion, filtering the data so as to include only ion signal intensity data and drift time or ion mobility data that are associated with mass to charge ratios in said range of mass to charge ratios, and identifying the drift time or ion mobility of said one of the different types of ion from the filtered data.

Data for ions other than said one of the different types of ion may be filtered out.

Optionally, said range of mass to charge ratios is determined to correspond to the mass to charge ratios that correspond to a peak in the intensity signal in the time domain or the modulation frequency domain.

Optionally, said one of the different types of ion is associated with drift times or ion mobilities that overlap with the drift times or ion mobilities of another of said different types of ions, but the range of mass to charge ratios that are associated with said one of the different types of ion do not overlap with the range of mass to charge ratios that are associated with said another of, the different types of ions.

The ions may be mass analysed at time intervals, optionally regular time intervals.

The step of determining the mass to charge ratios of the ions may comprise mass analysing the ions downstream of the ion mobility separator.

The ions may be mass analysed by a Time of Flight mass analyser, and optionally by an orthogonal acceleration Time of Flight mass analyser. However, alternative ion analysers may be used. For example, the time of flight mass analyser may be replaced by an analytical mass filter that is scanned or stepped so as to transmit different mass to charge ratios at different times. For example a quadrupole mass filter may be used. The filter may be scanned or stepped and data taken periodically for each step. The periodic interval or step may be less than the mass resolution of the filter and the mass ranges transmitted by the filter in each step may overlap. For example if the quadrupole has unit mass resolution, the set mass may be stepped by 0.2 amu. This will produce 5 points across each mass to charge ratio peak. Each of these 5 points has characteristic frequencies representing the ion mobilities of the population of ions transmitted in each step. This frequency profile over the mass peak may then be converted to the drift time domain so as to give drift time and mass to charge ratio information for each species.

Other filters such as differential mobility analysers or spectrometers (DMA or DMS) may be used and scanned to produce similar dimensional data sets, which may then be transformed by the same methods.

The step of determining the mass to charge ratios of the ions may comprise mass analysing the ions upstream of the ion mobility separator. The mass analysing may be performed by providing a mass filter upstream of the ion mobility separator and mass selectively transmitting ions of known mass to charge ratio to the ion mobility separator.

The mass to charge ratio or range of ratios transmitted by the mass filter may be scanned or stepped with time.

The method may be used to separate data for, or determine the presence of, different types of ions that have mass to charge ratios that overlap and/or that have ion mobilities that overlap.

The method may comprise providing a continuous ion beam towards the ion mobility separator such that the continuous ion beam is modulated at said first modulation frequency.

An entrance ion gate may be provided upstream of the ion mobility separator and a time-varying voltage may be applied to said entrance ion gate so as to periodically block the transmission of ions and hence modulate the introduction of ions into the ion mobility separator at said first modulation frequency. Alternatively, or additionally, an exit ion gate may be provided downstream of the ion mobility separator and a time-varying voltage may be applied to said exit ion gate so as to periodically block the transmission of ions from the ion mobility separator to the detector at said second modulation frequency.

Additionally, or alternatively to modulating an exit ion gate, the output from the detector may be modulated at the second modulation frequency.

The first and second modulation frequencies are preferably substantially the same at any given time. However, less preferably, the first and second frequencies may be different from each other. In either case, the first and second modulation frequencies are both varied with time. The first and second modulation frequencies may be continuously scanned or stepped monotonically with time.

Optionally, ions travel from the entrance to the exit of the on mobility separator along its longitudinal axis, and the ions are radially confined in directions orthogonal to the axis by RF potentials.

Although an ion mobility separator device has been described as the separator for separating the ions, other types of ion separators may be used for separating the ions according to a first physicochemical property. Also, the separator may separate analyte molecules, rather than ions. For example, isocratic multiplexed liquid chromatography or gas chromatography separation may be used.

Additionally, or alternatively, rather than determining the mass to charge ratios of the ions, a second physicochemical property other than mass to charge ratio may be determined.

Accordingly, from a second aspect the present invention provides a method of ion mobility and/or mass spectrometry comprising:

transmitting a plurality of ions or molecules to a separator that separates the ions or molecules according to a first physicochemical property;

modulating the introduction of the ions or molecules into the separator at a first modulation frequency;

separating the ions or molecules that enter the separator according to said first physicochemical property;

detecting said ions that have exited the separator with a detector, or ionising said molecules that exit the separator and then detecting the resulting ions with a detector;

wherein the transmission of ions to the detector is modulated at a second modulation frequency, or the detector output is modulated at a second modulation frequency, or the molecules are periodically ionised at a second modulation frequency;

varying the first and second modulation frequencies with time;

determining a second physicochemical property of the ions or molecules;

recording the intensity of the ion signal output from the detector as a function of the first or second modulation frequency and as a function of the second physicochemical property;

determining, from the variation in intensity of the ion signal as a function of the first or second modulation frequency, the first physicochemical property of the ions that have been detected, wherein the value of the first physicochemical property correlated with any given ion that has been detected is associated with the second physicochemical property correlated to that ion; and determining the presence of different types of ions or molecules in said plurality of ions or molecules by determining that the different types of ions or molecules have different combinations of first and second physicochemical property values.

The first physicochemical property may be the mobility of said ions or molecules through the separator under a first set of conditions; and the second physicochemical property may be the mobility of the ions or molecules under a second, different set of conditions.

The first physicochemical property may be the mobility of said ions or molecules through a first gas or first gas composition; and the second physicochemical property may be the mobility of the ions or molecules through a second, different gas or second, different gas composition.

The method may comprise adding one or more dopant to the first gas or first gas composition to affect the mobility of the ions or molecules therethrough prior to determining the first physicochemical property, and the second gas or second gas composition may include none or less of said dopant. Alternatively, the method may comprise adding one or more dopant to the second gas or second gas composition to affect the mobility of the ions or molecules therethrough prior to determining the second physicochemical property, and the first gas or first gas composition may include none or less of said dopant.

The first physicochemical property may be, or be representative of, the mobility of said ions or molecules through a gas at a first gas pressure; and the second physicochemical property may be, or be representative of, the mobility of the ions or molecules through a gas at a second, different gas pressure.

The first physicochemical property may be, or be representative of, the mobility of said ions through a gas under the influence of a first electric field; and the second physicochemical property may be, or be representative of the mobility of the ions through a gas under the influence of a second, different electric field.

By way of example, the method may employ a tandem ion mobility—ion mobility instrument in which the first ion mobility device is a FT-IMS device and the second ion mobility device is another IMS device. The second ion mobility device may operate on a faster timescale than the first device (i.e. a nested acquisition). In order to provide orthogonal information, the second ion mobility device may operate with a different gas or mixture of gases to the first device and/or the devices may operate at different pressures and/or the gases in the devices may contain different dopants and/or use different electric field strengths or different combinations of electric fields (e.g. FAIMS).

For example, the second ion mobility device may be an ion mobility filter (e.g. a FAIMS device) that is scanned or stepped so as to transmit ions having different mobilities at different times. The filter may be scanned or stepped and data taken periodically for each step. The periodic interval or step may be less than the mobility resolution of the filter and the mobility ranges transmitted by the filter in each step may overlap with each other. For example, the transmission window of the filter may be stepped to produce multiple points across each mobility peak.

The step of determining the second physicochemical property of the ions may comprise determining the second physicochemical property of the ions that are separated in the separator. Alternatively, the step of determining the second physicochemical property of the ions may comprise determining the second physicochemical property of the ions that result from the ionisation of the molecules.

The second aspect of the invention may have any one or combination of the preferred or optional features discussed herein in relation to the first aspect of the present invention. However, the ion mobility separator of the first aspect may be replaced in the second aspect of the invention with another type of separator that separates the ions or molecules by a first physicochemical property other than ion mobility, any references to ion mobility or drift time described in relation to the first aspect of the invention may relate in the second aspect of the invention to said first physicochemical property by which the ions are separated.

Similarly, as the mass to charge ratio determination of the first aspect may be replaced in the second aspect of the invention with determining another second physicochemical property, any references to mass to charge ratio described in relation to the first aspect of the invention may relate in the second aspect of the invention to said another second physicochemical property.

The second modulation is performed downstream of the ion mobility separator.

Accordingly, the invention provides a method of ion mobility mass spectrometry comprising:

transmitting a plurality of ions to an ion mobility separator;

modulating the introduction of the ions into the ion mobility separator at a first modulation frequency;

separating the ions that enter the ion mobility separator according to ion mobility;

detecting ions that have exited the ion mobility separator with a detector;

applying a modulation downstream of the ion mobility separator at a second modulation frequency so as to cause a modulation in data recorded from the detector;

varying the first and second modulation frequencies with time;

determining the mass to charge ratios of the ions;

determining from the variation in intensity of the ion signal, in the modulated data, optionally as a function of the first or second modulation frequency, the ion mobilities of the ions that have been detected, wherein the ion mobility for any given ion that has been detected is associated with the mass to charge ratio determined for that ion; and determining the presence of different types of ions in said plurality of ions by determining that the different types of ions have different combinations of ion mobility and mass to charge ratio.

This method may comprise any of the features described in relation to the first aspect, except wherein the second modulation is performed by the more broad step of applying a modulation downstream of the ion mobility separator at a second modulation frequency so as to cause the modulation in the data recorded from the detector.

The invention also provides a method of ion mobility and/or mass spectrometry comprising:

transmitting a plurality of ions or molecules to a separator that separates the ions or molecules according to a first physicochemical property;

modulating the introduction of the ions or molecules into the separator at a first modulation frequency;

separating the ions or molecules that enter the separator according to said first physicochemical property;

detecting said ions that have exited the separator with a detector, or ionising said molecules that exit the separator and then detecting the resulting ions with a detector;

applying a modulation downstream of the separator at a second modulation frequency so as to cause a modulation in data recorded from the detector;

varying the first and second modulation frequencies with time;

determining a second physicochemical property of the ions or molecules;

determining from the variation in intensity of the ion signal, in the modulated data, optionally as a function of the first or second modulation frequency, the values of the first physicochemical property of the ions that have been detected, wherein the value of the first physicochemical property correlated with any given ion that has been detected is associated with the value of the second physicochemical property correlated to that ion; and determining the presence of different types of ions or molecules in said plurality of ions or molecules by determining that the different types of ions or molecules have different combinations of first and second physicochemical property values.

This method may comprise any of the features described in relation to the second aspect, except wherein the second modulation is performed by the more broad step of applying a modulation downstream of the ion mobility separator at a second modulation frequency so as to cause the modulation in the data recorded from the detector.

From a third aspect, the present invention provides a method of ion mobility spectrometry comprising:

transmitting a plurality of ions to an ion mobility separator;

modulating the introduction of the ions into the ion mobility separator at a first modulation frequency;

separating the ions that enter the ion mobility separator according to ion mobility;

detecting ions that have exited the ion mobility separator with a detector;

wherein the transmission of ions from the ion mobility separator to the detector is modulated at a second modulation frequency, or the detector output is modulated at a second modulation frequency;

varying the first and second modulation frequencies with time;

recording the intensity of the ion signal output from the detector as a function of the first or second modulation frequency so as to obtain data in a modulation frequency domain;

defining at least one non-sinusoidal model signal having a frequency and amplitude, comparing the model signal to the signal output from the detector; calculating a goodness of fit between the model signal and the ion signal output from the detector; wherein if the goodness of fit indicates that the model signal and said ion signal match to within a predetermined probability or tolerance, or other convergence criterion, then the model signal is considered to represent one of the types of ions in said plurality of ions; and determining the ion mobility of said one of the types of ions from the frequency of the model signal.

The detector output may be modulated at the second modulation frequency by electronics and/or software in the detector. For example, the detector may be a detector system including a data acquisition system and the data acquisition system may modulate the data that is recorded so as to produce the detector output that is modulated at the second modulation frequency. In other words, only some of the data may be recorded by the acquisition system.

Optionally, said model signal is a periodic signal.

The method may comprise processing said data using a deconvolution technique by defining a plurality of non-sinusoidal model signals having different combinations of frequency and amplitude, superimposing the model signals and comparing the resulting composite signal to the signal output from the detector; calculating a goodness of fit between the composite signal and the ion signal output from the detector; wherein if the goodness of fit indicates that the composite signal and said ion signal match to within a predetermined probability or tolerance, or other convergence criteria, then each model signal is considered to represent a different type of ion in said plurality of ions; and determining the ion mobility of at least one of said different types of ion from the frequency of its respective model signal.

Optionally, the model signals are periodic signals.

The method may comprise determining the intensity of at least one of said different types of ion from the amplitude of its respective model signal.

As described above, each of the non-sinusoidal model signals may be considered to represent one of the types of ions in said plurality of ions. In this event, the amplitude of the model signal represents the intensity of said one of the types of ions in said plurality of ions, and the frequency of the model signal (in the modulation frequency domain) represents the ion mobility of said one of the types of ions in said plurality of ions.

Each model signal, and/or the ion signal from each one of different types of ions, may vary in intensity as a function of the first or second modulation frequency as a substantially triangular wave function.

One of said plurality of ions transmitted to the ion mobility separator may be a reference ion. The method may comprise determining the shape of the waveform for how the intensity of the reference ion varies as a function of the first or second modulation frequency, and selecting a shape of the waveforms for said model signals to be the same as the determined shape of the waveform for the reference ion.

The deconvolution technique may comprise an iterative forward modelling algorithm comprising: (i) modifying the amplitude and/or frequency of at least some of the model signals, (ii) superimposing the modified model signals, (iii) comparing the resulting composite signal to the signal output from the detector, and (iv) calculating a goodness of fit between the composite signal and the ion signal output from the detector; wherein steps (i)-(iv) may be repeatedly performed in an iterative manner until a termination criterion is satisfied, or until the goodness of fit between the composite signal and the ion signal output from the detector is within said predetermined probability or tolerance.

The termination criterion may be maximum likelihood, maximum entropy, or maximum a posteriori (MAP).

Accordingly, a maximum likelihood method, a maximum entropy method, a maximum a posteriori (MAP) method or a Bayesian method may be used in said iterative manner to determine when the superimposed model signals match the ion signal output from the detector.

The iterative process may be a Markov Chain Monte Carlo method or a nested sampling method, producing samples from a probability distribution where each sample represents a possible reconstruction of the time domain data.

The deconvolution technique may be a least squares or non-negative least squares algorithm.

The deconvolution technique may comprise a filter diagonalisaltion method.

The goodness of fit may be the probability of the detector output ion signal given the model signal(s).

The method may comprise: obtaining a predetermined relationship between the mass to charge ratios of the ions and the drift times of the ions; experimentally determining the mass to charge ratios of the ions; using the experimentally determined mass to charge ratios and said relationship to estimate the ion mobilities of the experimentally observed ions; selecting only model signals having frequencies that are representative of the estimated ion mobilities; and using only these selected model signals in said deconvolution technique.

The step of mass analysing may comprise mass analysing the ions downstream of the ion mobility separator; or the step of mass analysing may comprise mass analysing said ions upstream of the ion mobility separator, optionally wherein said mass analysing is performed by providing a mass filter upstream of the ion mobility separator and mass selectively transmitting ions of known mass to charge ratio to the ion mobility separator.

The mass to charge ratio or range of ratios transmitted by the mass filter may be scanned or stepped with time.

The step of obtaining a predetermined relationship between the mass to charge ratios of the ions and the drift times of the ions may comprise experimentally determining said relationship by mass analysing and ion mobility analysing the ions, or by looking up a predetermined relationship.

From a fourth aspect the present invention provides a method of ion mobility and/or mass spectrometry comprising:

transmitting a plurality of ions or molecules to a separator that separates the ions or molecules according to a first physicochemical property;

modulating the introduction of the ions or molecules into the separator at a first modulation frequency;

separating the ions or molecules that enter the separator according to said first physicochemical property;

detecting said ions that have exited the separator with a detector, or ionising said molecules that exit the separator and then detecting the resulting ions with a detector;

wherein the transmission of ions to the detector is modulated at a second modulation frequency, or the detector output is modulated at a second modulation frequency, or the molecules are periodically ionised at a second modulation frequency;

varying the first and second modulation frequencies with time;

recording the intensity of the ion signal output from the detector as a function of the first or second modulation frequency so as to obtain data in a modulation frequency domain;

defining at least one non-sinusoidal model signal having a frequency and amplitude, comparing the model signal to the signal output from the detector; calculating a goodness of fit between the model signal and the ion signal output from the detector; wherein if the goodness of fit indicates that the model signal and said ion signal match to within a predetermined probability or tolerance then the model signal is considered to represent one of the types of ions in said plurality of ions; and determining the first physicochemical property value of said one of the types of ions from the frequency of the model signal.

This aspect of the invention may have any one or combination of the preferred or optional features discussed herein in relation to the third aspect of the present invention. However, as the ion mobility separator of the third aspect may be replaced in the fourth aspect of the invention with another type of separator that separates the ions or molecules by a first physicochemical property other than ion mobility, any references to ion mobility or drift time described in relation to the third aspect of the invention would relate in the fourth aspect of the invention to said first physicochemical property by which the ions or molecules are separated.

For example, rather than using a relationship between the mass to charge ratios of the ions and the drift times of the ions (as described in embodiments of the third aspect of the present invention), a relationship between the mass to charge ratios of the ions and the first physicochemical property may be used. It is also contemplated that rather than using mass to charge ratio in the relationship, another second physicochemical property may be used.

A time correction that is a function of m/z or the second physicochemical property may be applied to the data prior to analysis. This function may be determined during calibration or setup of the instrument, or independently for each acquired dataset, e.g. using endogenous species or internal standards. For example, if a Time of Flight mass analyser is used, this technique enables unwanted post mobility time of flight offsets in the recorded data to be dealt with or compensated for.

The present invention also provides a spectrometer arranged and configured with control means to perform any of the methods described herein.

Accordingly, the first aspect provides a mass spectrometer comprising:

an ion mobility separator for separating ions that enter the ion mobility separator according to ion mobility;

an ion entrance modulator for modulating the introduction of the ions into the ion mobility separator at a first modulation frequency;

a detector for detecting ions that have exited the ion mobility separator;

an ion exit modulator for modulating the transmission of ions from the ion mobility separator to the detector at a second modulation frequency, or a detector modulator for modulating the detector output at a second modulation frequency;

a device for varying the first and second modulation frequencies with time;

an analyser for determining the mass to charge ratios of the ions;

a recording device for recording the intensity of the ion signal output from the detector as a function of the first or second modulation frequency and as a function of mass to charge ratio of the ions; and a processor configured to:

determine, from the variation in intensity of the ion signal as a function of the first or second modulation frequency, the ion mobilities of the ions that have been detected, wherein the ion mobility for any given ion that has been detected is associated with the mass to charge ratio determined for that ion; and determine the presence of different types of ions in said plurality of ions by determining that the different types of ions have different combinations of ion mobility and mass to charge ratio.

The second aspect provides an ion mobility and/or mass spectrometer comprising:

a separator for separating ions or molecules that enter the separator according to a first physicochemical property;

an entrance modulator for modulating the introduction of the ions or molecules into the separator at a first modulation frequency;

a detector for detecting ions that have exited the separator, or an ioniser for ionising molecules that exit the separator and a detector for then detecting the resulting ions;

an exit modulator for modulating the transmission of ions to the detector at a second modulation frequency, or a detector modulator for modulating the detector output at a second modulation frequency, or an ioniser for periodically ionising the molecules at a second modulation frequency;

a device for varying the first and second modulation frequencies with time;

a device for determining a second physicochemical property of the ions or molecules; and a processor configured to:

record the intensity of the ion signal output from the detector as a function of the first or second modulation frequency and as a function of the second physicochemical property;

determine, from the variation in intensity of the ion signal as a function of the first or second modulation frequency, the first physicochemical property of the ions that have been detected, wherein the value of the first physicochemical property correlated with any given ion that has been detected is associated with the second physicochemical property correlated to that ion; and determine the presence of different types of ions or molecules in said plurality of ions or molecules by determining that the different types of ions or molecules have different combinations of first and second physicochemical property values.

The third aspect provides an ion mobility spectrometer comprising:

an ion mobility separator for separating ions that enter the ion mobility separator according to ion mobility;

an ion entrance modulator for modulating the introduction of the ions into the ion mobility separator at a first modulation frequency;

a detector for detecting ions that have exited the ion mobility separator;

an ion exit modulator for modulating the transmission of ions from the ion mobility separator to the detector at a second modulation frequency, or a detector modulator for modulating the detector output at a second modulation frequency;

a device for varying the first and second modulation frequencies with time;

a recording device for recording the intensity of the ion signal output from the detector as a function of the first or second modulation frequency so as to obtain data in a modulation frequency domain; and one or more processor configured to: compare at least one non-sinusoidal model signal having a frequency and amplitude to the signal output from the detector; calculate a goodness of fit between the model signal and the ion signal output from the detector; wherein if the goodness of fit indicates that the model signal and said ion signal match to within a predetermined probability or tolerance, or other convergence criterion, then the one or more processor determines the model signal to represent one of the types of ions in said plurality of ions; and wherein the one or more processor is configured to determine the ion mobility of said one of the types of ions from the frequency of the model signal.

The fourth aspect provides an ion mobility and/or mass spectrometer comprising:

a separator for separating ions or molecules that enter the separator according to a first physicochemical property;

an entrance modulator for modulating the introduction of the ions or molecules into the separator at a first modulation frequency;

a detector for detecting ions that have exited the separator, or an ioniser for ionising molecules that exit the separator and a detector for then detecting the resulting ions;

an exit modulator for modulating the transmission of ions to the detector at a second modulation frequency, or a detector modulator for modulating the detector output at a second modulation frequency, or an ioniser for periodically ionising the molecules at a second modulation frequency;

a device for varying the first and second modulation frequencies with time;

a recording device for recording the intensity of the ion signal output from the detector as a function of the first or second modulation frequency so as to obtain data in a modulation frequency domain; and one or more processor configured to: compare at least one non-sinusoidal model signal having a frequency and amplitude to the signal output from the detector; calculate a goodness of fit between the model signal and the ion signal output from the detector; wherein if the goodness of fit indicates that the model signal and said ion signal match to within a predetermined probability or tolerance then the one or more processor determines the model signal to represent one of the types of ions in said plurality of ions; and wherein the one or more processor is configured to determine the first physicochemical property value of said one of the types of ions from the frequency of the model signal.

The invention also provides a method of ion mobility spectrometry comprising:

transmitting a plurality of ions to an ion mobility separator;

modulating the introduction of the ions into the ion mobility separator at a first modulation frequency;

separating the ions that enter the ion mobility separator according to ion mobility;

detecting ions that have exited the ion mobility separator with a detector;

applying a modulation downstream of the ion mobility separator at a second modulation frequency so as to cause a modulation in data recorded from the detector;

varying the first and second modulation frequencies with time;

obtaining a data signal representing the variation in intensity of the ion signal, in the modulated data, optionally as a function of the first or second modulation frequency;

defining at least one non-sinusoidal model signal having a frequency and amplitude, comparing the model signal to the data signal; calculating a goodness of fit between the model signal and the data signal; wherein if the goodness of fit indicates that the model signal and said data signal match to within a predetermined probability or tolerance, or other convergence criterion, then the model signal is considered to represent one of the types of ions in said plurality of ions; and determining the ion mobility of said one of the types of ions from the frequency of the model signal.

The invention also provides a method of ion mobility and/or mass spectrometry comprising:

transmitting a plurality of ions or molecules to a separator that separates the ions or molecules according to a first physicochemical property;

modulating the introduction of the ions or molecules into the separator at a first modulation frequency;

separating the ions or molecules that enter the separator according to said first physicochemical property;

detecting said ions that have exited the separator with a detector, or ionising said molecules that exit the separator and then detecting the resulting ions with a detector;

applying a modulation downstream of the separator at a second modulation frequency so as to cause a modulation in data recorded from the detector;

varying the first and/or second modulation frequencies with time;

obtaining a data signal representing the variation in intensity of the ion signal, in the modulated data, optionally as a function of the first or second modulation frequency;

defining at least one non-sinusoidal model signal having a frequency and amplitude, comparing the model signal to the data signal; calculating a goodness of fit between the model signal and the data signal; wherein if the goodness of fit indicates that the model signal and said data signal match to within a predetermined probability or tolerance then the model signal is considered to represent one of the types of ions in said plurality of ions; and determining the first physicochemical property value of said one of the types of ions from the frequency of the model signal.

The spectrometer may comprise:

(a) an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; and (xxvi) a Solvent Assisted Inlet Ionisation ("SAII") ion source; and/or (b) one or more continuous or pulsed ion sources; and/or (c) one or more ion guides; and/or (d) one or more ion mobility separation devices and/or one or more Field Asymmetric Ion Mobility Spectrometer devices; and/or (e) one or more ion traps or one or more ion trapping regions; and/or (f) one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device; and/or (g) a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic or orbitrap mass analyser; (x) a Fourier Transform electrostatic or orbitrap mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser; and/or (h) one or more energy analysers or electrostatic energy analysers; and/or (i) one or more ion detectors; and/or (j) one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter; and/or (k) a device or ion gate for pulsing ions; and/or (l) a device for converting a substantially continuous ion beam into a pulsed ion beam.

The spectrometer may further comprise either:

(i) a C-trap and an orbitrap (RTM) mass analyser comprising an outer barrel-like electrode and a coaxial inner spindle-like electrode, wherein in a first mode of operation ions are transmitted to the C-trap and are then injected into the orbitrap (RTM) mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the orbitrap (RTM) mass analyser; and/or (ii) a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

According to an embodiment the spectrometer further comprises a device arranged and adapted to supply an AC or RF voltage to the electrodes. The AC or RF voltage may have an amplitude selected from the group consisting of: (i) <50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii) 300-350 V peak to peak; (viii) 350-400 V peak to peak; (ix) 400-450 V peak to peak; (x) 450-500 V peak to peak; and (xi) >500 V peak to peak.

The AC or RF voltage may have a frequency selected from the group consisting of: (i) <100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv) >10.0 MHz.

The embodiments relates to a method of acquiring and processing a two dimensional array of frequency modulated data from a velocity dispersive device, such as the gated ion mobility device described, coupled to a down-stream mass spectrometer capable of a spectral acquisition rate allowing accurate digitization of the intensity modulation. This leads to improved accuracy of measurement and quantification of both mobility collision cross-section and mass to charge ratio values, as compared with the prior art.

In the embodiments of the method modulated IMS intensity data is acquired for an array of mass to charge ratio values over each mass to charge ratio peak profile characteristic of the mass resolution of the mass filter or mass separator. The array of mass to charge ratios verses gate frequency data produced may then be processed to give more accurate mass to charge ratio and IMS drift time data.

For example, when coupled with time of flight mass spectrometry, an array of mass to charge ratio, gate frequency and intensity data may be produced.

An advantage of producing and processing this two dimensional m/z vs gate frequency data is that the modulation of the signal from the velocity dispersive device at each sampled point on the m/z axis contains far fewer modulation frequencies than over a large m/z window or without m/z separation allowing faster and more accurate conversion of the data to an IMS drift time scale for each m/z value.

Also, signals from partially resolved m/z species may be resolved by the characteristic modulation frequencies corresponding to different ion mobilities and the pure intensity profile of these peaks reconstructed leading to more accurate quantification and m/z assignment.

BRIEF DESCRIPTION OF THE DRAWINGS

An embodiment of the present invention will now be described, by way of example only, and with reference to the accompanying drawings in which.

DETAILED DESCRIPTION

Figure 1:
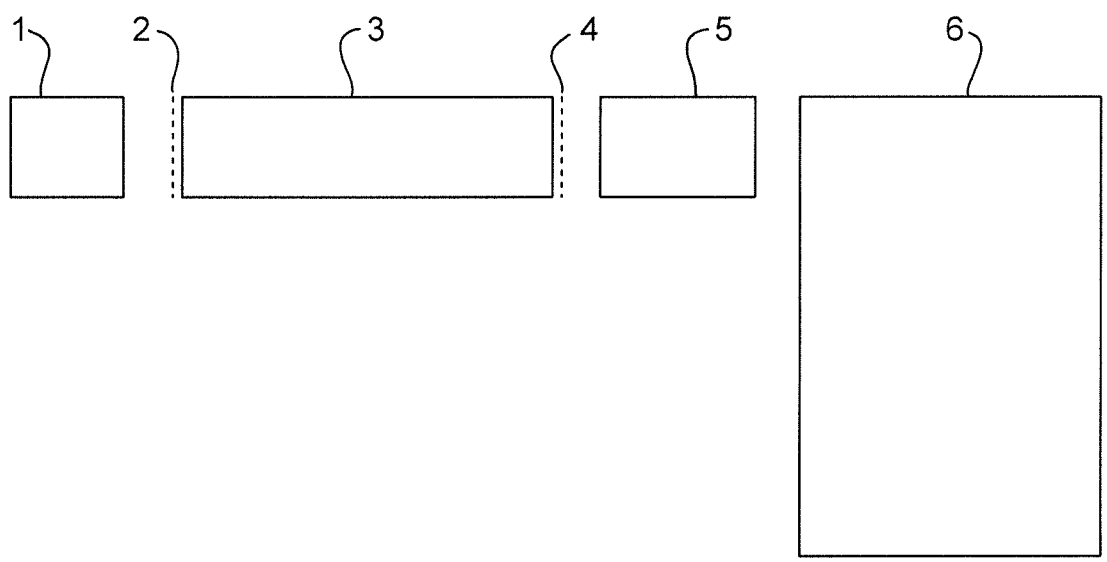
FIG. 1 shows a schematic of an FT-IMS instrument according to an embodiment of the present invention.

FIG. 1 shows a schematic of an embodiment of a FT-IMS device. The instrument comprises a continuous ion source 1, an entrance ion gate 2, an IMS device 3, an exit ion gate 4, a downstream device 5, and an orthogonal acceleration time of flight mass analyser 6.

During operation the ion source 1 supplies a continuous beam of ions towards the IMS device 3. Electrical potentials are applied to the entrance ion gate 2 so as to periodically allow ions to enter the IMS device 3 and periodically block ions from entering the IMS device 3. Ions that are permitted to enter the IMS device 3 by the ion gate 2 are caused to separate in the IMS device 3 according to their ion mobility through a gas in the IMS device 3. Electrical potentials are applied to the exit ion gate 4 so as to periodically block ions from exiting the IMS device 3 and periodically allow ions to exit the IMS device 3. The ions that exit the IMS device 3 through the exit ion gate 4 may be transmitted to one or more downstream devices 5. If present, the one or more downstream devices 5 may comprise a quadrupole mass filter, a reaction for reacting the ions with other ions so as to form product ions, or a dissociation device for fragmenting the ions.

In order to periodically block and transmit ions, each of the entrance and exit ion gates 2,4 may be supplied with an AC voltage. The same AC voltage may be applied to both of the ion gates 2,4. For example, the ion gates 2,4 may be supplied with a square wave AC voltage having a 50% duty cycle. When the AC voltage is high, ions are blocked by the ion gates 2,4 and when the AC voltage is low, ions are permitted to be transmitted through the ion gates 2,4. The frequency of the voltage applied to each of the ion gates 2,4 is scanned or stepped monotonically with time so as to produce a modulated output signal from the IMS device 3. This modulated signal is mass analysed at regular intervals using the orthogonal acceleration time of flight mass analyser 6. The intensity of the ion signal and the mass to charge ratios of the ions are detected as a function of the frequency of the voltage applied to the ion gates 2,4. This produces a two-dimensional, nested array of intensity data for both mass to charge ratio and gate voltage frequency.

The amplitude of the ion signal output from the IMS device 3, for an ion of any given ion mobility, varies as a substantially triangular wave function having a frequency that is characteristic of the ion mobility of the ion. This data, representing the ion signal amplitude obtained in the frequency domain of the ion gate voltage, is then Fourier transformed so as to produce an ion mobility separation spectrum that represents the ion signal amplitude as a function of IMS drift time.

Figure 2A:
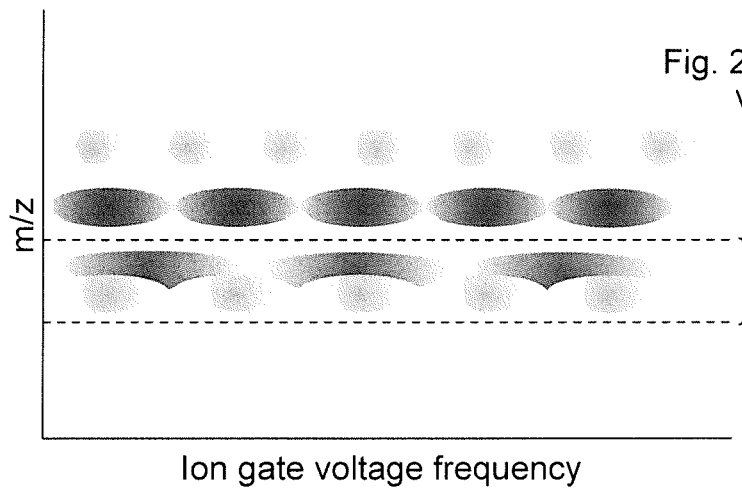
FIG. 2A shows the ion signal intensity measured by the instrument of FIG. 1 as a function of both gate voltage frequency and mass to charge ratio.

FIG. 2A shows an intensity contour plot for the ion signal detected at the orthogonal acceleration time of flight mass analyser 6 as a function of both mass to charge ratio of the detected ions and the voltage frequency applied to the ion gates 2,4. As can be seen from FIG. 2A, the intensity plot is divided into four rows that are arranged at different mass to charge ratio values. This indicates the presence of four types of ion of different mass to charge ratios, wherein each type of ion is represented by one of the rows. The darker the plot is within any given row, the more intense the ion signal detected. In this embodiment, each of the types of ions has a different ion mobility. As described above, for an ion of a given ion mobility, the amplitude of the ion signal exiting the exit gate 4 varies as a substantially triangular wave function having a frequency that is characteristic of the ion mobility of the ion. Accordingly, the intensity plot in each row in FIG. 2A varies as a series of substantially triangular profiles as a function of the frequency of the voltage applied to the ion gates 2,4. The frequency of the triangular wave is different for each row of intensity plots in FIG. 2A, thus indicating that the four types of ions represented by the four rows have different ion mobilities.

Figure 2B:
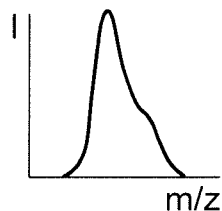
FIG. 2B shows the ion signal intensity as a function of mass to charge ratio for two ions having overlapping mass to charge ratios in the data of FIG. 2A.

The mass to charge ratios for the two types of ions represented by the two lowermost rows in FIG. 2A overlap. FIG. 2B shows a plot of the intensity of the ion signal for these two types of ions as a function of mass to charge ratio. These two types of ions may be, for example, the same species of ions but having different charge states. It will be appreciated from FIG. 2B that the two types of ions cannot be resolved from the intensity and mass to charge ratio data alone. However, the plot of FIG. 2A shows that ion signal intensities for these two types of ions vary periodically with different frequencies, as a function of ion gate voltage frequency. These two types of ions therefore have different ion mobilities, which may be used to resolve the two types of ions.

As described above, for any given ion, the frequency with which the ion signal varies as a function of gate voltage frequency is characteristic of the ion mobility of the ion. The ion signal measured in the gate voltage frequency domain may be transformed to the time domain in order to represent the drift time (i.e. ion mobilities) of the ions through the IMS device 3. This transformation may be performed by a Fourier transformation or by other suitable processing techniques.

Figure 3A:
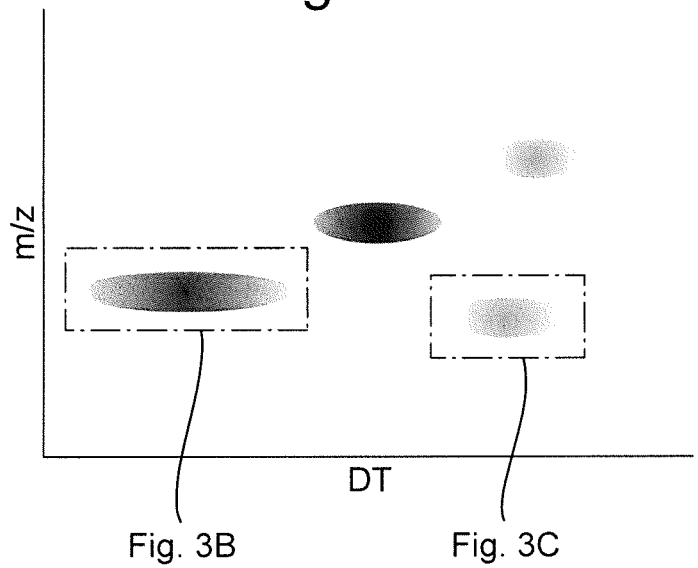
FIG. 3A shows data of FIG. 2A after conversion from the gate voltage frequency domain to the IMS drift time domain.

FIG. 3A shows the data of FIG. 2A after being Fourier transformed from the gate voltage frequency domain to the IMS drift time domain. Therefore, FIG. 3A shows plots of the ion signal intensities as a function of mass to charge ratio and drift time through the IMS device 3. FIG. 3A shows four intensity plots arranged at different mass to charge ratio values, indicating the presence of four types, as in FIG. 2A. The darker the shading is within any one of the four plots, the more intense the ion signal detected. In contrast to the data of FIG. 2A, it can be seen that the four plots are well separated by either drift time or mass to charge ratio. It is therefore possible to resolve the four types of ions more accurately.

For example, a mass peak may be more accurately determined for any given type of ion by determining the range of drift times (i.e. ion mobilities) that are associated with a type of ion, and then filtering the data so as to only include ion signal intensity data and mass to charge ratio data that are associated with drift times in said range. This excludes ion data for ions having similar or overlapping mass to charge ratios but dissimilar IMS drift times.

Figure 3B:
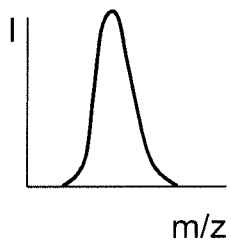
FIGS. 3B and 3C shows the ion signal intensities as a function of mass to charge ratio for two ions species in the data of FIG. 3A that correspond to the two ions having overlapping mass to charge ratios in the data of FIG. 2A.

FIG. 3B shows a plot of ion signal intensity as a function of mass to charge ratio for the type of ion represented by the second lowest row in FIGS. 2A and 3A. In order to obtain the plot of FIG. 3B, the data represented by FIGS. 2A and 3A has been filtered so as to only include ion signal and mass to charge ratio data that are associated with drift times corresponding to the drift times of the type of ion represented by the second lowest row in FIG. 3A.

Figure 3C:
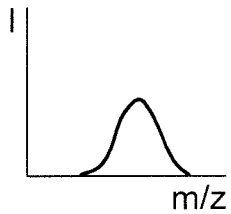

Similarly, FIG. 3C shows a plot of ion signal intensity as a function of mass to charge ratio for the type of ion represented by the lowest row in FIGS. 2A and 3A. In order to obtain the plot of FIG. 3C, the data represented by FIGS. 2A and 3A has been filtered so as to only include ion signal and mass to charge ratio data that are associated with drift times corresponding to the drift times of the type of ion represented by the lowest row in FIG. 3A.

It will be appreciated by comparing FIGS. 3B and 3C to FIG. 2B that the above described technique enables two types of ions of overlapping mass to charge ratios to be resolved. The mass to charge ratio for these two types of ions can therefore be determined more accurately from the resolved peaks.

In the method described above, the drift time has been used to resolve ions having overlapping mass to charge ratios. However, it is also contemplated that the drift time of different ions may overlap and that the mass to charge ratios of these ions may be used to resolve the two types of ions. For example, in FIG. 2A different rows of the intensity plots may have the same intensity pattern as a function of ion gate voltage frequency, thus indicating overlapping ion mobilities (i.e. drift times), but these rows may be at substantially different, non-overlapping mass to charge ratios. An ion mobility peak may be more accurately determined for any given type of ion by determining the range of mass to charge ratios that are associated with a type of ion, and then filtering the data so as to only include ion signal intensity data and drift time data that are associated with mass to charge ratios in said range. This excludes ion data for ions having similar or overlapping drift time but dissimilar mass to charge ratios.

Although the present invention has been described with reference to various embodiments, it will be understood by those skilled in the art that various changes in form and detail may be made without departing from the scope of the invention as set forth in the accompanying claims.

For example, although three dimensional data sets have been described herein, higher dimensional datasets may be produced by combining several such techniques.

As described above, the same frequency voltage may be applied to the ion gates 2,4. However, it should be noted that different frequencies could be applied, although this is less preferable as it would require more complex processing to determine ion mobility.

Although the present invention has been described as having both an entrance gate 2 into the IMS 3 and an exit gate 4, it is contemplated that the exit gate need not be present. Rather, the ion detector output may be modulated at the frequency that the IMS exit gate 2 would have been modulated.

A time of flight mass analyser may be used to obtain the ion signal and mass to charge ratio data as a function of in gate voltage frequency. However, other ion analysers may be used. The time of flight mass analyser may be replaced by an analytical mass filter that is scanned or stepped so as to transmit different mass to charge ratios at different times. For example a quadrupole mass filter may be used. The filter may be scanned or stepped and Fourier transform data taken for periodically or for each step. In this case the periodic interval or step is less than the mass resolution of the filter and the mass ranges transmitted by the filter in each step overlap. For example if the quadrupole has unit mass resolution, the set mass may be stepped by 0.2 amu. This will produce 5 points across each mass to charge ratio peak. Each of these 5 points has characteristic frequencies representing the ion mobilities of the population of ions transmitted in each step. This frequency profile over the mass peak may then be de-convolved to give drift time and mass to charge ratio information for each species.

Other filters such as differential mobility analysers or spectrometers (DMA or DMS) may be used and scanned to produce similar three dimensional data sets, which may then be transformed by the same methods.

There are many ways to process the three dimensional data set described herein. For example data corresponding to each mass to charge ratio point or step may be processed separately and displayed as mass to charge ratio verses frequency array for further processing. These frequency values may then converted to IMS drift times or collision cross-sections using prior calibration information for each point or step.

A series of overlapping moving average mass to charge ratio windows may be processed to produce a smoother result and to improve statistics in the final transformed data.

A Fourier transform may be used to identify the drift time of the ions, as described above.

It is however advantageous to use a two-dimensional processing algorithm to determine the likely frequency (the frequency of the ion signal in the intensity-gate voltage domain, i.e. the likely drift time) in each region of the m/z, time, intensity data.

Optionally, a known correlation between mass to charge ratio, charge state and mobility may be used to estimate or restrict the likely frequency range or ranges expected. This can speed up data processing and reduce artefacts and or mis-assignment.

Treating transformation of the data using a two dimensional fitting algorithm improves the statistical error associated with individual m/z samples which in turn improves the precision of both the m/z and drift time values calculated.

Approaches other that Fourier Transform may be taken to calculate the drift time from the characteristic variation of the of the ion signal amplitude recorded downstream of the IMS device 3.

The ion signal output by the modulated-IMS instrument may be closer to a triangular wave than a pure sine wave and may be truncated in ion gate voltage frequency. As such, deconvolution by Fourier transform may give results which have artefacts and side lobes on the peaks. These artefacts may give rise to mis-assignment of ion mobility and may require further processing such as apodisation. Accordingly, techniques other than Fourier transform may be used to transform the data in the gate voltage frequency domain to data in the drift time domain. Such alternative techniques may include the use of forward modelling algorithms such as a maximum likelihood (least squares) method, a maximum entropy method, a Bayesian (probabilistic) method, or Filter diagonalisation.

In forward modelling methods, it is desired to determine a set of model modulated signals that when superimposed match the experimentally observed modulated signals. The model may use triangular waves rather than pure sine waves and so may be more accurate than Fourier transform techniques. The method iterates different combinations of modelled waves having differing frequencies and amplitudes until the best match for the experimentally obtained signal is determined. The model waves making up the best match are then used to determine the ion mobilities and intensities of the ions. More specifically, the frequency and amplitude of each of the model waves in the best fit model represents the drift time (i.e. ion mobility) and intensity, respectively, of an experimentally observed ion.

The coupling of the modulated-IMS device with mass spectrometry facilitates application of these forward fitting techniques with practical timescales. For example, a correlation between mass to charge ratios of the ions and the drift times may be known or determined and used to simplify the modelling process. In particular, the mass to charge ratios of the ions may be determined and the correlation may then be used to determine the drift times of the ions that would be expected. The forward modelling need then only model waves having frequencies that correspond to the expected drift times of the ions. Model waves of other frequencies need not be considered as they would correspond to drift times of ions that are not present. This process significantly simplifies the modelling. The mass to charge ratios may be determined by mass analysing the ions downstream of the IMS device and/or by providing a mass filter upstream of the IMS device that mass selectively transmits only certain ranges of mass to charge ratios.

Forward fitting of model data may be applied to each narrow mass to charge ratio region in which far fewer species exist and therefore the signal is greatly simplified resulting in more precise results in far shorter timescales.

The form or shape of the model data to use during forward fitting may be obtained from calibration standards or sufficiently pure species within the analyte. This is advantageous as it is more accurate to determine the form or shape of model data using a real reference sample rather than use a theoretical model. For example, in the case where a signal is being fitted to intensity-gate modulation frequency data, theoretical model signals having a sine wave form could be used. However it would be more accurate to experimentally determine how the intensity of a reference compound (i.e. a calibration standard or sufficiently pure species) varies in the modulation frequency domain and then use model signals having the same form. For example, the intensity of the reference compound may vary as a function of gate voltage frequency as a triangular wave. Model signals of triangular waveform would then be used so as to fit the data more accurately.

This technique can be extended to measure a 3D surface for a reference compound so as to construct a model for forward fitting in the m/z-modulation frequency-intensity data. The model may include information about the known mass to charge ratio resolution or peak shape in the mass dimension, the sampling frequency of the mass spectrometer, or a known correlation between m/z, charge state and ion mobility to estimate a likely frequency range or ranges within each m/z region. This further simplifies and speeds up the fitting of model data.

The forward fitting approach described above may potentially yield superior IMS resolution and better signal to noise than Fourier transform techniques for this type of non-ideal data.

Although an IMS device has been described as the separator for separating ions, other separators may be used. For example, isocratic multiplexed LC or GC separation may be used.

The invention claimed is:

1. A method of ion mobility mass spectrometry comprising:
   transmitting a plurality of ions to an ion mobility separator;
   modulating the introduction of the ions into the ion mobility separator at a first modulation frequency;
   separating the ions that enter the ion mobility separator according to ion mobility;
   detecting ions that have exited the ion mobility separator with a detector;
   wherein the transmission of ions from the ion mobility separator to the detector is modulated at a second modulation frequency, or the detector output is modulated at a second modulation frequency;
   varying the first and second modulation frequencies with time;
   determining the mass to charge ratios of the ions;
   recording a two dimensional array of modulated data by recording the intensity of the ion signal output from the detector as a function of the first or second modulation frequency and as a function of mass to charge ratio of the ions;
   determining, from the variation in intensity of the ion signal as a function of the first or second modulation frequency, the ion mobilities of the ions that have been detected, wherein the ion mobility for any given ion that has been detected is associated with the mass to charge ratio determined for that ion; and
   determining the presence of different types of ions in said plurality of ions by determining that the different types of ions have different combinations of ion mobility and mass to charge ratio.

2. The method of claim 1, wherein the ion signal output from the detector is comprised of contributions of different ion signals from different types of ions, wherein the ion signal from each of the different types of ions varies in intensity as a function of the first or second modulation frequency with a frequency that is characteristic of the ion mobility for that ion, and wherein said characteristic frequency associated with each different type of ion is used to determine the ion mobility of that ion.

3. The method of claim 1, wherein the intensity of the ion signal output from the detector is measured as a function of the first or second modulation frequency so as to obtain data in a modulation frequency domain; and wherein the method comprises processing said data so as to transform it from said modulation frequency domain into the time domain so as to represent the intensity of the ion signal output from the detector as a function of the drift time through the ion mobility separator; and wherein the ion mobilities of the ions are determined from the drift times at which the ion signal peaks.

4. The method of claim 3, wherein the method comprises transforming said data from said modulation frequency domain into the time domain so as to represent the intensity of the ion signal output from the detector as a function of the drift time through the ion mobility separator and as a function of mass to charge ratio.

5. The method of claim 4, wherein the ion signal output from the detector is comprised of contributions of different ion signals from different types of ions, and wherein the ion signals contributed by the different types of ions do not overlap with each other when represented in a two dimensional space as function mass to charge ratio and drift time.

6. The method of claim 3, wherein the data is transformed from said modulation frequency domain into the time domain by Fourier transformation; or
   wherein the data is transformed from said modulation frequency domain into the time domain by a forward modelling deconvolution technique.

7. The method of claim 3, comprising determining a range of drift times or ion mobilities that are associated with one of the different types of ion, filtering the data so as to include only ion signal intensity data and mass to charge ratio data that are associated with drift times or ion mobilities in said range, and identifying the mass to charge ratio of said one of the different types of ion from the filtered data.

8. The method of claim 3, comprising determining a range of mass to charge ratios that are associated with one of the different types of ion, filtering the data so as to include only ion signal intensity data and drift time or ion mobility data that are associated with mass to charge ratios in said range of mass to charge ratios, and identifying the drift time or ion mobility of said one of the different types of ion from the filtered data.

9. The method of claim 1, wherein said step of determining the mass to charge ratios of the ions comprises mass analysing said ions downstream of the ion mobility separator; or wherein said step of determining the mass to charge ratios of the ions comprises mass analysing said ions upstream of the ion mobility separator, optionally wherein said mass analysing is performed by providing a mass filter upstream of the ion mobility separator and mass selectively transmitting ions of known mass to charge ratio to the ion mobility separator.

10. The method of claim 1, wherein the method is used to separate data for, or determine the presence of, different types of ions that have mass to charge ratios that overlap and/or that have ion mobilities that overlap.

11. The method of claim 1, comprising providing a continuous ion beam towards the ion mobility separator such that the continuous ion beam is modulated at said first modulation frequency; and/or wherein an entrance ion gate is provided upstream of the ion mobility separator and a time-varying voltage is applied to said entrance ion gate so as to periodically block the transmission of ions and hence modulate the introduction of ions into the ion mobility separator at said first modulation frequency; and/or wherein an exit ion gate is provided downstream of the ion mobility separator and a time-varying voltage is applied to said exit ion gate so as to periodically block the transmission of ions from the ion mobility separator to the detector at said second modulation frequency.

12. A spectrometer arranged and configured to perform the method of claim 1, the spectrometer comprising:

an ion mobility separator for separating ions that enter the ion mobility separator according to ion mobility;

an ion entrance modulator for modulating the introduction of the ions into the ion mobility separator at a first modulation frequency;

a detector for detecting ions that have exited the ion mobility separator;

an ion exit modulator for modulating the transmission of ions from the ion mobility separator to the detector at a second modulation frequency, or a detector modulator for modulating the detector output at a second modulation frequency;

a device for varying the first and second modulation frequencies with time;

an analyser for determining the mass to charge ratios of the ions;

a recording device for recording a two dimensional array of modulated data by recording the intensity of the ion signal output from the detector as a function of the first or second modulation frequency and as a function of mass to charge ratio of the ions; and a processor configured to:
  determine, from the variation in intensity of the ion signal as a function of the first or second modulation frequency, the ion mobilities of the ions that have been detected, wherein the ion mobility for any given ion that has been detected is associated with the mass to charge ratio determined for that ion; and
  determine the presence of different types of ions in said plurality of ions by determining that the different types of ions have different combinations of ion mobility and mass to charge ratio.

13. A method of as claimed in claim 1, comprising:

defining at least one non-sinusoidal model signal having a frequency and amplitude, comparing the model signal to the signal output from the detector; calculating a goodness of fit between the model signal and the ion signal output from the detector;

wherein if the goodness of fit indicates that the model signal and said ion signal match to within a predetermined probability or tolerance, or other convergence criterion, then the model signal is considered to represent one of the types of ions in said plurality of ions; and determining the ion mobility of said one of the types of ions from the frequency of the model signal.

14. The method of claim 13, comprising processing said data using a deconvolution technique by defining a plurality of non-sinusoidal model signals having different combinations of frequency and amplitude, superimposing the model signals and comparing the resulting composite signal to the signal output from the detector; calculating a goodness of fit between the composite signal and the ion signal output from the detector; wherein if the goodness of fit indicates that the composite signal and said ion signal match to within a predetermined probability or tolerance, or other convergence criteria, then each model signal is considered to represent a different type of ion in said plurality of ions; and determining the ion mobility of at least one of said different types of ion from the frequency of its respective model signal.

15. The method of claim 13, comprising determining the intensity of at least one of said different types of ion from the amplitude of its respective model signal.

16. The method of claim 13, wherein each model signal, and/or the ion signal from each one of different types of ions, varies in intensity as a function of the first or second modulation frequency as a substantially triangular wave function.

17. The method of claim 13, wherein one of said plurality of ions transmitted to the ion mobility separator is a reference ion, wherein the method comprises determining the shape of the waveform for how the intensity of the reference ion varies as a function of the first or second modulation frequency, and selecting a shape of the waveforms for said model signals to be the same as the determined shape of the waveform for the reference ion.

18. A method of ion mobility mass spectrometry comprising:

transmitting a plurality of ions to an ion mobility separator;

modulating the introduction of the ions into the ion mobility separator at a first modulation frequency;

separating the ions that enter the ion mobility separator according to ion mobility;

detecting ions that have exited the ion mobility separator with a detector;

applying a modulation downstream of the ion mobility separator at a second modulation frequency so as to cause a modulation in data recorded from the detector;

varying the first and second modulation frequencies with time;

determining the mass to charge ratios of the ions;

recording a two dimensional array of modulated data by recording the intensity of the ion signal output from the detector as a function of the first or second modulation frequency and as a function of mass to charge ratio of the ions;

determining from the variation in intensity of the ion signal, in the modulated data, the ion mobilities of the ions that have been detected, wherein the ion mobility for any given ion that has been detected is associated with the mass to charge ratio determined for that ion; and determining the presence of different types of ions in said plurality of ions by determining that the different types of ions have different combinations of ion mobility and mass to charge ratio.

19. A method of ion mobility and/or mass spectrometry comprising:

transmitting a plurality of ions or molecules to a separator that separates the ions or molecules according to a first physicochemical property;

modulating the introduction of the ions or molecules into the separator at a first modulation frequency;

separating the ions or molecules that enter the separator according to said first physicochemical property;

detecting said ions that have exited the separator with a detector, or ionising said molecules that exit the separator and then detecting the resulting ions with a detector;

applying a modulation downstream of the separator at a second modulation frequency so as to cause a modulation in data recorded from the detector;

varying the first and second modulation frequencies with time;

determining a second physicochemical property of the ions or molecules;

recording a two dimensional array of modulated data by recording the intensity of the ion signal output from the detector as a function of the first or second modulation frequency and as a function of the second physicochemical property;

determining from the variation in intensity of the ion signal, in the modulated data, the values of the first physicochemical property of the ions that have been detected, wherein the value of the first physicochemical property correlated with any given ion that has been detected is associated with the value of the second physicochemical property correlated to that ion; and determining the presence of different types of ions or molecules in said plurality of ions or molecules by determining that the different types of ions or molecules have different combinations of first and second physicochemical property values.

20. A method of as claimed in claim 19, comprising:

defining at least one non-sinusoidal model signal having a frequency and amplitude, comparing the model signal to the signal output from the detector; calculating a goodness of fit between the model signal and the ion signal output from the detector; wherein if the goodness of fit indicates that the model signal and said ion signal match to within a predetermined probability or tolerance then the model signal is considered to represent one of the types of ions in said plurality of ions; and determining the first physicochemical property value of said one of the types of ions from the frequency of the model signal.

* * * * *